United States Patent [19]

Gertsch

[11] Patent Number: 4,896,847
[45] Date of Patent: Jan. 30, 1990

[54] AERODYNAMIC BRAKING SYSTEM FOR RECOVERING A SPACE VEHICLE

[75] Inventor: Paul R. Gertsch, San Diego, Calif.

[73] Assignee: General Dynamics Corporation, Convair Division, San Diego, Calif.

[21] Appl. No.: 265,990

[22] Filed: Nov. 2, 1988

[51] Int. Cl.[4] .............................................. B64G 1/22
[52] U.S. Cl. ................................. 244/158 R; 244/160
[58] Field of Search ............... 244/158 R, 158 A, 113, 244/138 R, 160, 162, 161

[56] References Cited

U.S. PATENT DOCUMENTS 3,118,636  1/1964  Kantrowitz et al. ............... 244/113
3,604,667  9/1971  Moraes ................................. 244/160

OTHER PUBLICATIONS

"Orbital Transfer Vehicle (OTV) Concept Definition Study" Report No. GDC ASP 80-012, Feb. 23, 1981, pp. 4-3-1-4-3-18.

Primary Examiner—Galen L. Barefoot
Attorney, Agent, or Firm—John R. Duncan; Frank D. Gilliam

[57] ABSTRACT

An aerobrake for an orbital transfer vehicle that permits recovery of the vehicle for refurbishment and reuse after a payload has been deployed in a desired geo-synchronous earth orbit by slowing the vehicle for reentry of the vehicle to a low earth orbit for return to earth by a shuttle vehicle on the like for recovery and reuse. The aerobrake includes a flexible thermal blanket that is folded inwardly against the vehicle in a predetermined stored manner and which, after the payload is deployed, is driven to an extended position by power hinges that drive a plurality of supporting panel members that cooperate with drag links to provide a lightweight strong supporting structure for the thermal blanket.

14 Claims, 4 Drawing Sheets

AERODYNAMIC BRAKING SYSTEM FOR RECOVERING A SPACE VEHICLE

BACKGROUND OF THE INVENTION

1. Field of the Invention

This invention relates to an improved aerodynamic braking system for use in recovering a space vehicle, and more particularly but not by way of limitation, to an improved aerodynamic braking system for use in returning a space vehicle from space and placing it into a low earth orbit where it can be recovered and/or refurbished for reuse.

2. Description of the Prior Art

The development of space technology has enabled the placing of objects in orbit around the earth or at high altitudes about the earth has generated a need for recovery system to return objects to the earth safely. Various schemes have been proposed and actually employed; for example, rigid metal shields have been used to protect an object to be recovered against the heat of air friction, retro-rockets have been used to reduce the rate of descent of objects through the atmosphere and parachute systems have been used to reduce descent velocity during the last stages of descent. The prime disadvantage encountered in the use of prior systems is that they comprised heavy and bulky equipment.

The deployable/retractable aerobrake recovery system of the present invention is useful in the recovery of any of a variety of objects from outer space or the upper reaches of the atmosphere. One of its most important uses is in the recovery of orbital transfer vehicles or rocket boosters. Rocket boosters used to carry satellites or other objects to the upper reaches of the atmosphere or beyond are generally not recovered but are allowed to fall to the earth after use. Such a procedure is very wasteful inasmuch as the boosters are very expensive and contain a large amount of equipment that could be reused. The primary reason why boosters are not recovered is that prior recovery systems were so heavy and bulky that the cost of carrying them with the booster offset the saving in recovering the booster. Furthermore, damage to the booster resulting from landing impact or immersion in water was often extensive. The present invention provides a recovery system which is lightweight and compact so that it is practical to include it with a rocket booster to enable the booster to be recovered in a largely undamaged state and to be reused with a minimum of refurbishment.

The present invention of an improved aerodynamic braking system is particularly adapted for use with an orbital transfer vehicle that may advantageously supported within the cargo bay of a reusable launch vehicle for deployment of the orbital transfer vehicle from the launch vehicle in space. The development of a reusable space launch vehicle, generally referred to as the "space shuttle" provides considerable savings in cost, time and efficiency over earlier expendable launch vehicles.

The space shuttle is limited in orbital heights which can be reached. In order to place payloads in higher orbits, or to go beyond earth orbit, it is necessary that an upper stage, sometimes called the "space tug" be carried into initial orbit in the shuttle, then be deployed and used to carry a payload mounted on the upper stage to the desired location beyond the shuttle orbit. These payloads can include relatively large antenna reflectors of the type employed in communication satellites, earth sensors, navigation sensors, and other devices for precisely orienting the spacecraft.

The space vehicle is supported in the shuttle cargo bay in a manner which will prevent damage to the payload by attenuating loads during shuttle liftoff and abort landings. Greater load attenuation permits lighter and more efficient upper stage and/or payload structures.

The space vehicle support system rapidly and reliably deploys the space vehicle from the stored position within the cargo bay to a location away from the shuttle. Further, the deployment system should be capable of retrieving a space vehicle and returning it to a stored position.

The patented prior art includes U.S. Pat. No. 3,118,636 issued on Jan. 21, 1964 to Arthur R. Kantrowitz et al for a SPACE VEHICLE which disclosed an adjustable drag brake that may be opened and closed as necessary to regulate the flight path, orientation, deceleration, and landing of a man carrying capsule. The Kantrowitz patent however is only directed to the recovery of the space capsule and is not concerned in any respect with the launching device for such capsule.

U.S. Pat. Nos. 4,518,1137 and 4,504,031 were issued to Dana G. Andrews for AERODYNAMIC BRAKING SYSTEM FOR A SPACE VEHICLE and AERODYNAMIC BRAKING AND RECOVERY METHOD FOR A SPACE VEHICLE respectively. These patents disclose a space vehicle that is steered from outer space toward the earth's atmosphere with the main rocket nozzle end first. A jettisonable inflatable braking member is deployed around the vehicle by introducing gas into it. The shape of the inflatable braking bag member may be varied.

U.S. Pat. No. 3,286,951 issued on Nov. 22, 1966 to R. T. Kendall for a RECOVERY SYSTEM discloses a rocket booster provided with a flexible shield of heat resistant material adapted for deployment into a bulbous shape and an inflatable bag attached to the shield and adapted for inflatable disposal partially within the boundaries defined by the shield. The Kendall recovery system is also provided with inflation means for inflating the bag.

U.S. Pat. No. 3,228,634 dated Jan. 11, 1966 and issued to G. Chakoian et al for AIR-DRAG APPARATUS FOR MISSILES relates to an apparatus for use in the retardation and stabilization of airborne missiles. The apparatus includes a jettisonable air braking device attached to a torpedo for slowing the air speed of a torpedo prior to entry into a water body, said air braking device including a plurality of vanes that are deployed by means of an hydraulic circuit after the torpedo has been launched from an aircraft.

None of the above cited patents disclose a light simple easily deployed aerobrake for slowing an orbital transfer vehicle for reentry into the earth's atmosphere that utilizes a plurality of folded ribs that unfold in deployment to support a thermal blanket for protection of the vehicle during reentry.

SUMMARY OF THE INVENTION

Briefly stated, the present invention contemplates an aerobrake for an orbital transfer vehicle that includes a central adapter connected at one end of the vehicle and a payload adapter ring that couples the adapter ring to a payload, the payload adapter ring adapted to being decoupled from the central adapter after the payload has been deployed. The aerobrake includes a flexible thermal blanket means that is adapted to be folded longitudinally against itself in an annular folded shape to surround the central adapter and payload adapter ring when the aerobrake is in a stowed position. Hinged panel means are connected to the thermal blanket and arranged to support the thermal blanket in its inwardly folded position when the aerobrake is stowed.

Power hinge means are carried by the orbital transfer vehicle and are adapted to selectively drive the hinged panel means to an extended deployed position and to support the thermal blanket means in an annular bowl like configuration whereby after the payload has been deployed in a desired geo-synchronous earth orbit the launch vehicle may be slowed for reentry to a low earth orbit for return to earth by shuttle vehicle or the like for recovery and reuse of the orbital transit vehicle and aerobrake.

Further features and advantages of this invention are described below in the description of the preferred embodiment.

BRIEF DESCRIPTION OF THE DRAWINGS

In the drawings like element designations refer to like parts, and.

DETAILED DESCRIPTION OF THE DRAWINGS

Figure 1:
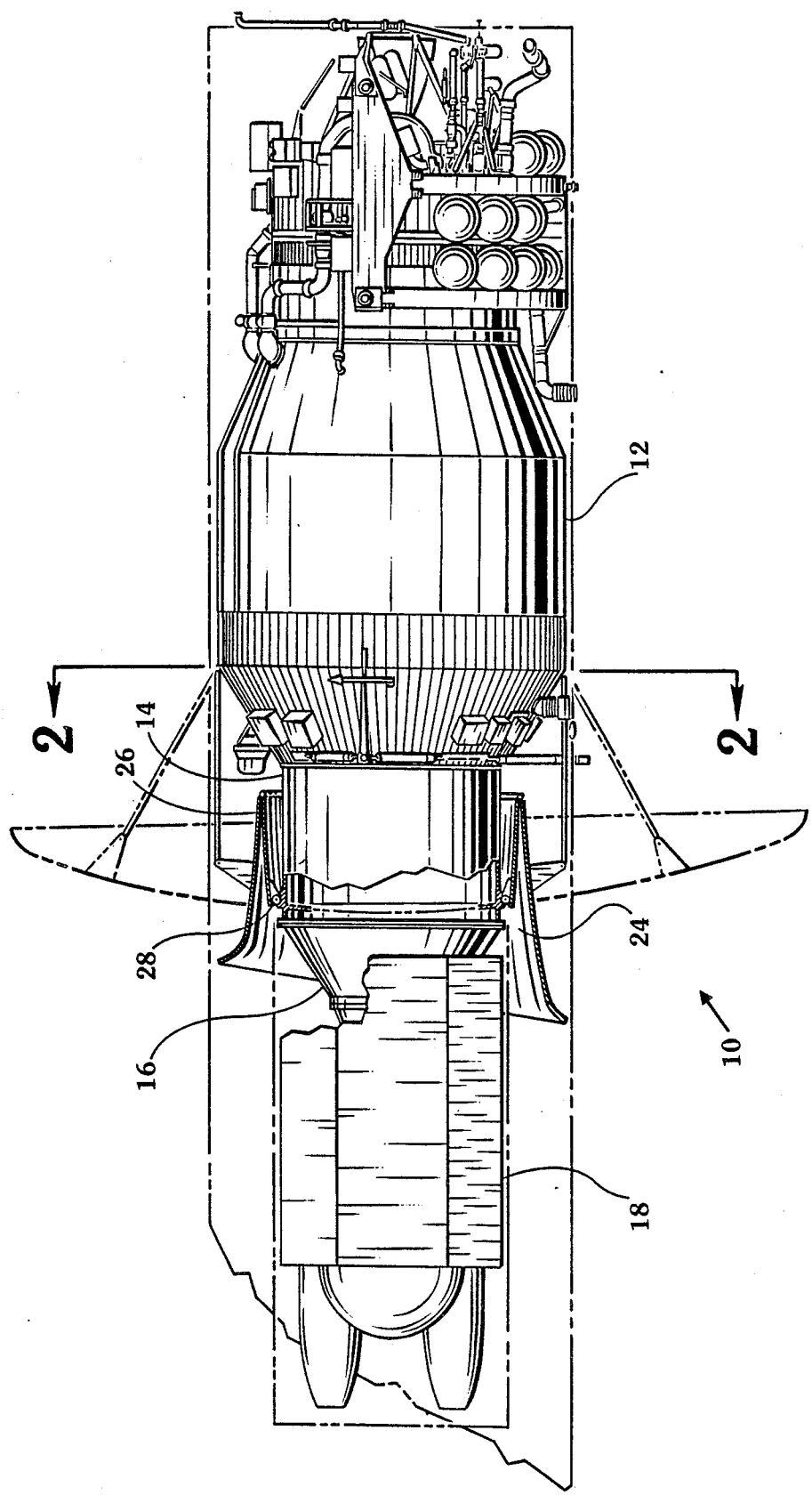
FIG. 1 is a schematic representation of an orbital launch vehicle that includes a central adapter connected at one end of the vehicle and a payload adapter ring that couples the adapter ring to a payload and an aerobrake constructed in accordance with the present invention.

Referring now to the drawings in detail and in particular to FIG. 1, the reference character 10 generally designates an aerobrake for an orbital transfer vehicle 12 that is constructed in accordance with a preferred embodiment of the present invention. The orbital launch vehicle 12 is illustrated in a simplified manner for ease of illustration and could for example be any suitable space vehicle. The vehicle 12 is connected through a suitable central adapter 14 that is connected in turn to a suitable adapter ring 16 coupled to a payload 18. In the vehicle 12, for example, the payload 18 could be a 5000 pound satellite to be placed in a desired Orbital path around the earth. After the payload 18 and the adapter ring 16 have been separated from the adapter ring 14 the payload 18 may in turn be separated from the adapter ring 16 when desired.

Figure 2:
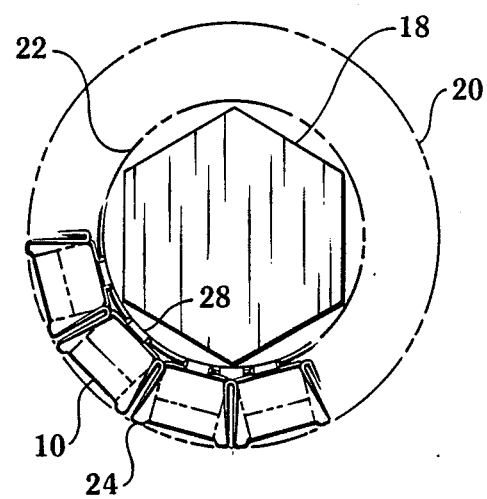
FIG. 2 is schematic representation of sectional envelopes that must be accommodated by the payload and the orbital launch vehicle.

Referring briefly now to FIG. 2, it will be seen that the vehicle 12 and its attached aerobrake 10 provide a cross section envelope 20 designated by the dotted line that may be easily accommodated within the space shuttle of the National Aeronautics and Space Administration of the United States of America. The dashed circle line 22 illustrates the envelope, in turn, of the payload 18.

Turning again to FIG. 1, it will be seen that the aerobrake 10 of the present invention includes a flexible thermal blanket means 24 that is adapted to be folded longitudinally against itself in an annular folded shape to surround the central adapter 14 and the payload adapter ring 16 when the aerobrake 10 is stowed. The shape of the folded thermal blanket means 24 can be considered to be generally similar to that of a collapsible folding umbrella.

Suitable hinged panel means 26 are connected to the thermal blanket 24 and are arrange to support the thermal blanket 24 in its inwardly folded position when the aerobrake 10 is stowed. Power hinge means 28 carried by the orbital transfer vehicle 12 is mounted on central adapter 14 and adapted to selectively drive the hinged panel means 26 to an extended deployed position and to support the thermal blanket 24 in an annular bowl like configuration, as seen in dashed outline in FIG. 1, whereby after the payload 18 has been deployed in a desired geo-synchronous earth orbit the launch vehicle 12 may be slowed for reentry to a low earth orbit for return to earth by a shuttle or other vehicle for recovery and reuse of the orbital transfer vehicle 12 and the aerobrake 10.

Figure 3:
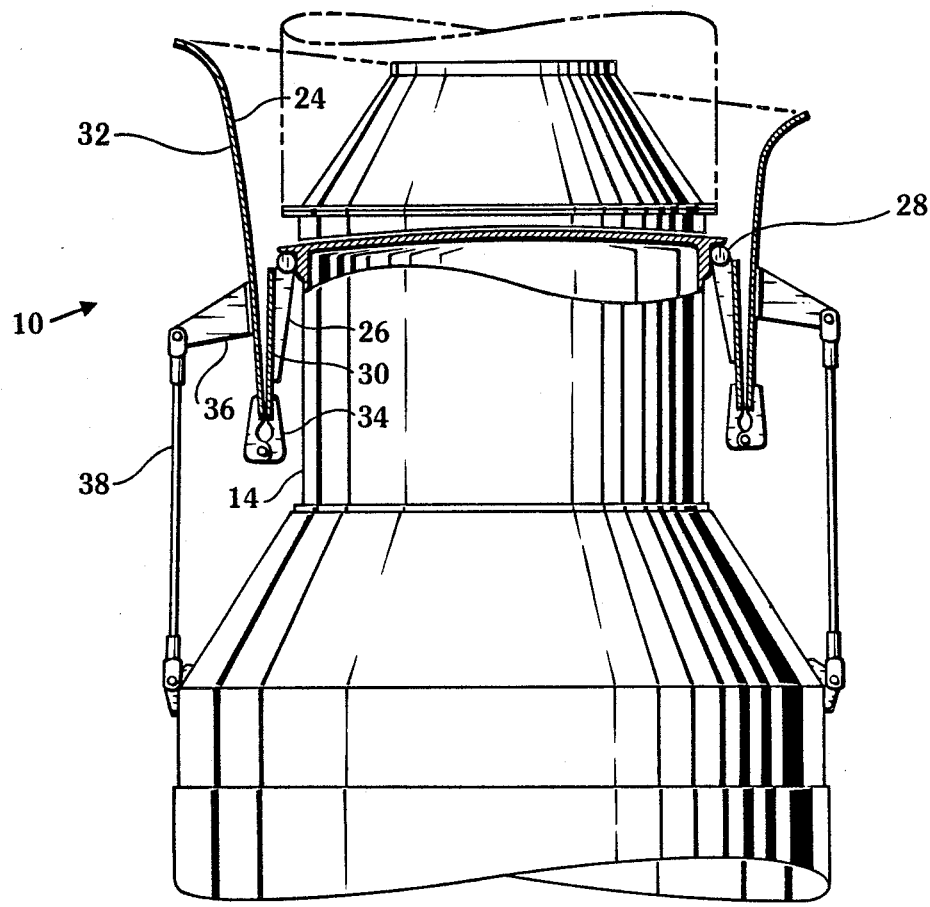
FIG. 3 is schematic of the aerobrake shown in FIG. 1 in a stowed position.
Figure 4:
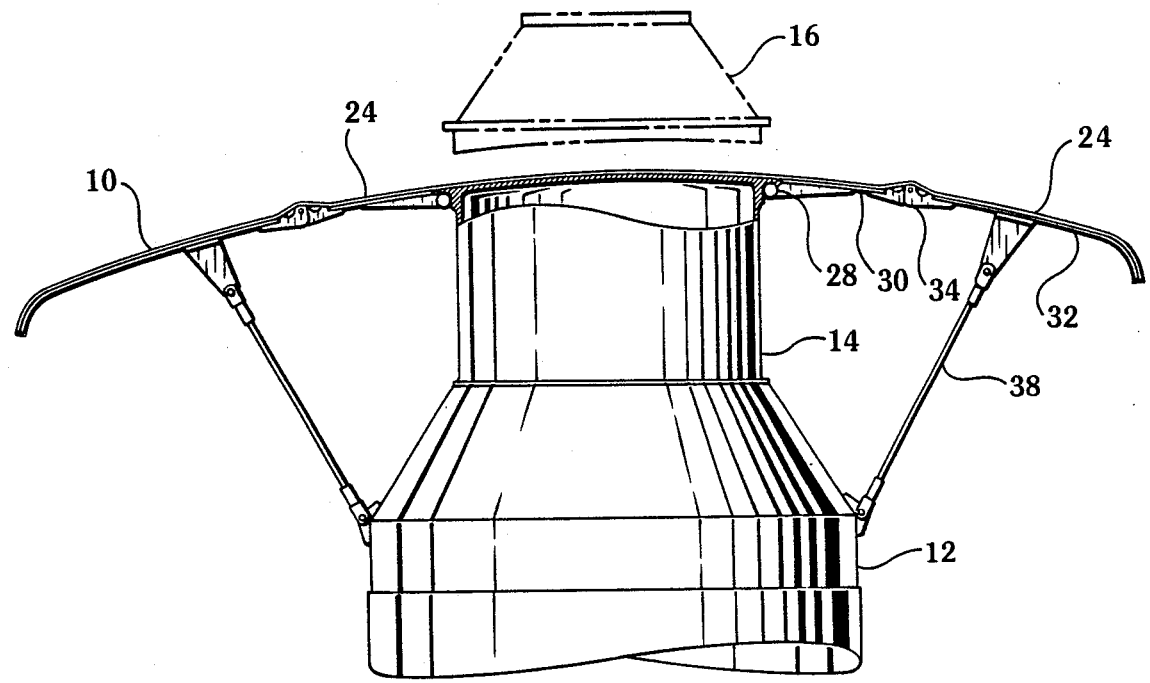
FIG. 4 is a schematic of the aerobrake shown in FIG. 1 in a deployed position after the payload has been separated from the orbital launch vehicle.

Referring now to FIGS. 3 and 4, the aerobrake 10 of the present invention as positioned on a suitable orbital transfer vehicle 12 is seen in greater detail. In a typical example the envelope of a typical orbital transfer vehicle 12 could be approximately 180 inches in diameter and the typical payload envelope could be approximately 117 inches in diameter. In FIG. 3 the aerobrake 10 is seen in its retracted or stowed position. The aerobrake 10 includes a flexible thermal blanket means 24 that is made of any suitable material that can withstand temperatures up to 2500 degrees F. The thermal blanket means 24 is adapted to be folded longitudinally against itself in an annular folded shape to surround the central adapter 14 and the payload adapter ring 16. For ease of illustration the folds of the thermal blanket 24 are not shown in FIGS. 3 and 4.

The hinged panel means 26 includes the first panel member 30 and an associated cooperating second panel member 32 that are hinged together by a suitable lockable hinge 34. In a typical example there would be twelve sets of cooperating panel members 30 and 32. The panel members 30 and 32 are preferably made of a suitable construction that provides a high strength to weight ratio such as a honeycomb core sandwich construction. The panel members 30 and 32 are configured to provide the desired shape to the thermal blanket 24.

Each panel member 32 is provided with an outwardly extending member 36 that is hingedly connected to a suitable drag link 38 that is hingedly connected to a suitable drag link 38 that is hingedly connected at an opposing end to the main body of the space vehicle 12. Each drag link member 38 cooperates with a pair of panel members 30 and 32 that are backed together to provide a strong, lightweight supporting structure for the thermal blanket means 24.

In FIG. 4 it will be noted that the thermal blanket means 24 is considered to extend over the tip of the adapter 14 to provide a unitary thermal blanket after the adapter ring 16 is separated from the orbital transfer vehicle 12 during the course of the performance of the mission. While not shown for ease of illustration, it is to be understood that the attached points between the adapter ring 16 and the adapter 14 that are uncovered when the adapter ring 16 is separated from the adapter 14 after payload deployment will be covered by suitably insulated doors. The thermal means that extends over the forward face of the adapter ring need not necessarily be composed of the same material as the flexible thermal blanket that is deployed but may be constructed of any suitable insulating material.

Figure 5:
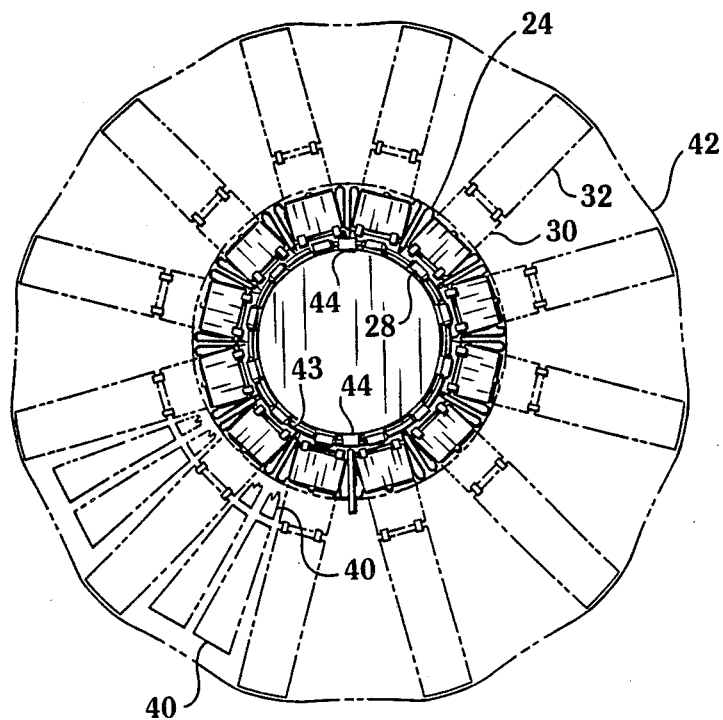
FIG. 5 is a simplified section of the orbital launch vehicle taken along lines 5—5 of FIG. 1 and showing the aerobrake in a deployed position.

FIG. 5 shows the aerobrake of the present invention in a stowed position and, in dashed outline, in a deployed position. It will be seen that as shown in the deployed position suitable batten numbers 40 are secured to the underside of the thermal blanket means 24 between the panel members 30 and 32 to assist in importing a fold memory to the blanket means 24 and to assist in guiding the blanket means 24 to restrict the folding to the desired areas and to guide the thermal blanket means 24 to a properly folded position when the aerobrake 10 is retracted. A suitable cable means 42 is also connected between the panel members 32 to assist in supporting the thermal blanket means 24 when the aerobrake 10 is deployed.

It should be noted that the power hinges 28 are driven through suitable flexible shafting 43 that is powered by suitable dual D.C. stepping motors 44.

Figure 6:
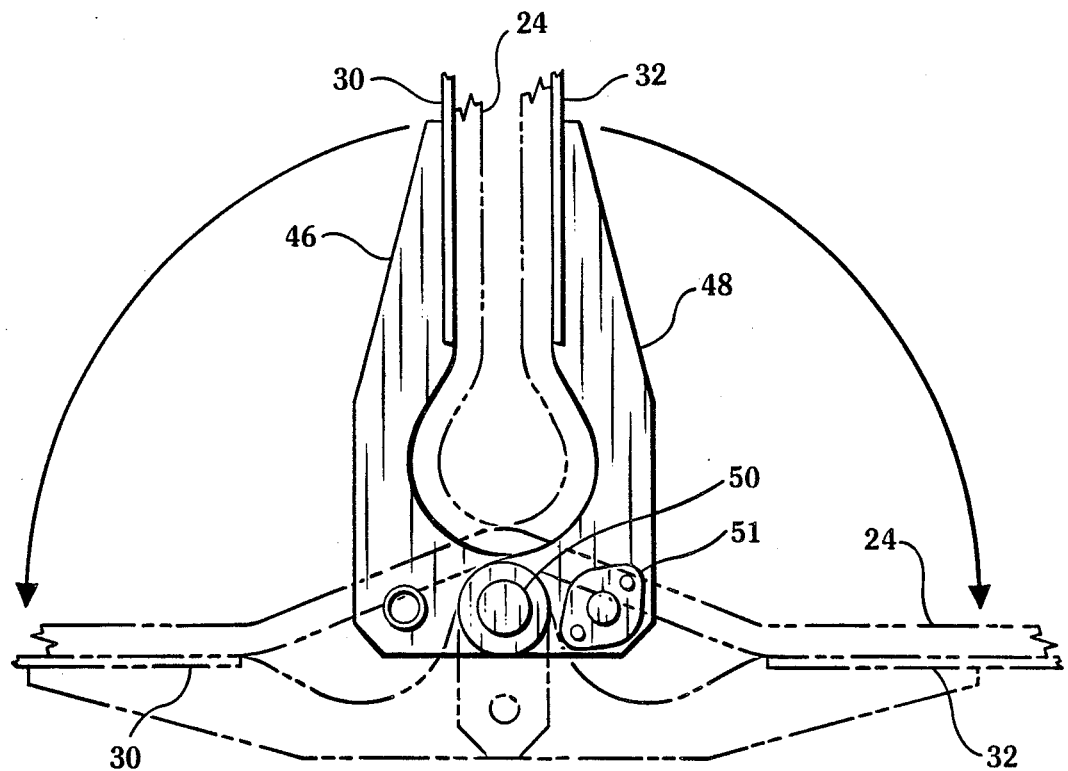
FIG. 6 is a fragmentary section of a hinge of the aerobrake of FIG. 1.

FIG. 6 shows the lockable hinge 34 in greater detail. The lockable hinge 34 is shown in a substantially stowed position in solid lines and in dashed lines in a deployed position. The hinge 34 comprises a first portion 46 and a second portion 48 that are suitably journaled on shaft 50. A suitable locking pin assembly 51 is provided to lock the hinge in position when the aerobrake 10 is deployed.

Figure 7:
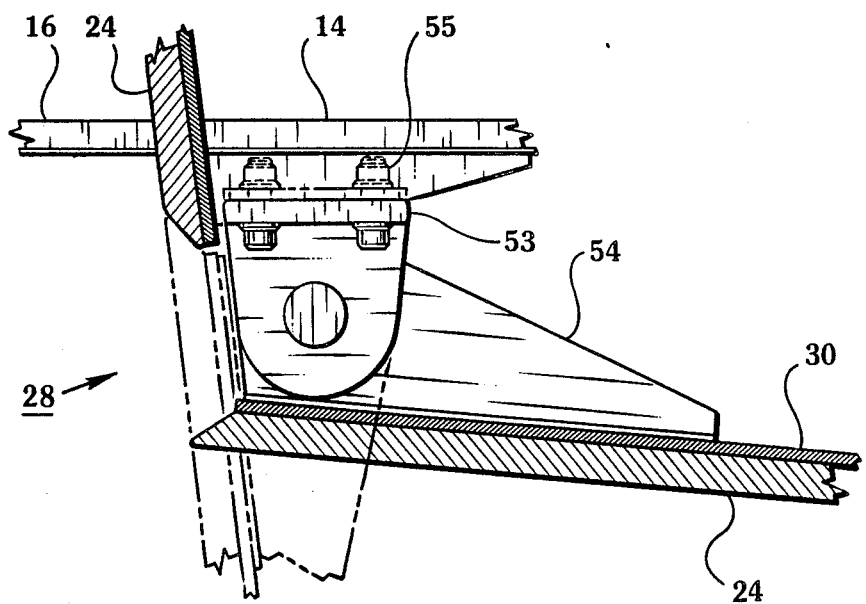
FIG. 7 is a fragmentary section of the power hinge of the aerobrake of FIG. 1.

Similarly the power hinge 28 is shown in greater detail in FIG. 7. It will be seen that the ends of the thermal blanket that are carried by the adapter 14 and the panel members have their ends cooperatively chamfered to provide a unitary thermal blanket when the aerobrake 10 is deployed. One portion 53 of the hinge 28 is suitably bolted to the adapter 14 by bolts 55 while a cooperating portion 54 of the hinge 28 is suitably secured to the panel 30.

Thus, as shown above, there is provided an aerobrake for a space vehicle, such as an orbital transfer vehicle for an upper stage/satellite combination, in a space shuttle orbiter or other space launch vehicle that permits recovery of the space vehicle after deployment of the satellite in a desired earth orbit. The aerobrake permits recovery and reuse of the space vehicle thereby reducing the costs of placing satellites in earth orbit.

While certain specific components and arrangements have been described in detail in the above description of a preferred embodiment, these may be varied and other components used, where suitable, with similar results. Various modifications, applications and ramifications of the present invention will occur to those skilled in the art upon reading this disclosure. These are intended to be included within the scope of this invention as defined in the appended claims.

I claim:

1. An aerobrake for an orbital transit vehicle that includes a central adapter connected at one end of the vehicle and a payload adapter ring that couples the adapter to a payload, the payload adapter ring being decoupled from the central adapter after the payload has been deployed, the aerobrake comprising:

a flexible thermal blanket means that is adapted to be folded longitudinally against itself in an annular folded shape to surround the central adapter and payload adapter ring when the aerobrake is in a stowed position;

hinged panel means connected to the thermal blanket and arranged to support the thermal blanket in its inwardly folded position when the aerobrake is stowed; and power hinge means carried by the orbital transfer vehicle and adapted to selectively drive the hinged panel means to an extended deployed position and to support the thermal blanket means in an annular bowl like configuration whereby after the payload has been deployed in a desired geo-synchronous earth orbit the launch vehicle may be slowed for reentry to a low earth orbit for return to earth for recovery and reuse of the orbital transfer vehicle and the aerobrake.

2. The aerobrake of claim 1 wherein the hinged panel means comprises a plurality of hinged panel rib members that are radially spaced around the outer circumference of the central adapter.

3. The aerobrake of claim 2 wherein the hinged panel rib members are pivotally connected at their upper ends to the outer end of the central adapter.

4. The aerobrake of claim 3 wherein the hinged panel rib members are formed of a honeycomb construction.

5. The aerobrake claim 4 wherein each panel rib member comprises a first member having a straight configuration pivotally connected to the adapter ring at one end and a second member having a generally curved portion and being hingedly connected to the first member whereby when the aerobrake is deployed the rib members are pivotally and hingedly extended outwardly to impart a bowl like configuration to the thermal blanket.

6. The aerobrake of claim 5 wherein the power hinge means includes a driving hinge that is connected to the adapter ring and each first rib member for driving the panel rib members their fully extended braking position.

7. The aerobrake of claim 6 wherein the power hinge means further includes flexible shafting means that is drivingly connected to said driving hinge, said flexible shafting means adapted to be driven by electric motor means to drive the plurality of panel rib members to an extended braking position.

8. The aerobrake of claim 7 which further includes drag link means that are hingedly connected to the panel rib members.

9. The aerobrake of claim 8 wherein the drag link means includes a plurality of drag link members, each drag link member being pivotally connected at one end to the body of the orbital transit vehicle and pivotally connected at its other end to a second rib panel member for support of the panel rib members and to the thermal blanket means connected thereto when the aerobrake is deployed to its extended braking position.

10. The aerobrake of claim 9 wherein the hinge means pivotally connecting the first and second rib members may be selectively locked whereby the panel members may give maximum support to the thermal blanket when the aerobrake is deployed to a fully extended braking position.

11. The aerobrake of claim 10 which further includes thermal protection material being positioned over the outer end of the central adapter and arranged to cooperate with the annular thermal blanket to provide one continuous thermal shield for the vehicle when the aerobrake is deployed.

12. The aerobrake of claim 10 wherein the thermal blanket means and the hinged panel means are dimensioned to provide an asymmetric shape to the aerobrake with respect to the body of the vehicle in order to permit the vehicle to be more easily maneuvered by providing the necessary lift vector control.

13. The aerobrake of claim 10 wherein the thermal blanket means further includes batten members connected on the inner side of the thermal blanket means and positioned adjacent to the first and second rib members in order to assist the thermal blanket means in assuming its folded position when the aerobrake is moved to its stowed position prior to commencement of a mission.

14. The aerobrake of claim 13 wherein flexible cable members are connected between the hinged panel members to provide additional support to the thermal blanket means when the aerobrake is deployed.

* * * * *